(12) United States Patent
Schneider et al.

(10) Patent No.: US 9,936,242 B2
(45) Date of Patent: Apr. 3, 2018

(54) MERGING CONTENT CHANNELS

(71) Applicant: GOOGLE INC., Mountain View, CA (US)

(72) Inventors: Michael Patrick Schneider, Venice, CA (US); Justin Lewis, Marina del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/588,152

(22) Filed: Dec. 31, 2014

(65) Prior Publication Data

US 2015/0245094 A1 Aug. 27, 2015

Related U.S. Application Data

(60) Provisional application No. 61/944,493, filed on Feb. 25, 2014, provisional application No. 61/944,495, filed on Feb. 25, 2014.

(51) Int. Cl.
*H04N 7/10* (2006.01)
*H04N 7/025* (2006.01)
*H04N 21/2668* (2011.01)
*H04N 21/643* (2011.01)
*H04N 21/44* (2011.01)
(Continued)

(52) U.S. Cl.
CPC ....... *H04N 21/2668* (2013.01); *H04N 21/252* (2013.01); *H04N 21/25866* (2013.01); *H04N 21/2743* (2013.01); *H04N 21/44016* (2013.01); *H04N 21/4788* (2013.01); *H04N 21/64322* (2013.01); *H04N 21/25841* (2013.01); *H04N 21/25883* (2013.01); *H04N 21/25891* (2013.01); *H04N 21/462* (2013.01); (Continued)

(58) Field of Classification Search
CPC ............. H04N 21/2668; H04N 21/222; H04N 21/2385; H04N 21/25841; H04N 21/25883; H04N 21/44016; H04N 21/462; H04N 21/472; H04N 21/4882; H04N 21/64322; H04N 21/64784
See application file for complete search history.

(56) References Cited

U.S. PATENT DOCUMENTS 8,370,874 B1  2/2013 Chang
8,745,206 B1  6/2014 Chang
(Continued)

OTHER PUBLICATIONS

International Search Report and the Written Opinion of the International Searching Authority for International Patent Application No. PCT/US2015/017577, dated Jun. 10, 2015, 7 pages.
(Continued)

*Primary Examiner* — Yassin Alata
(74) *Attorney, Agent, or Firm* — Lowenstein Sandler LLP

(57) ABSTRACT

A method for merging content channels is disclosed. The method includes identifying, by a processing device, target channels to merge into a result channel, wherein the result channel is formed in view of at least one set of users of the target channels viewing at least one of a same set or a similar set of content items from the target channels. The method further includes subscribing, by the processing device, the users of the target channels to the result channel and associating, by the processing device, the set of the content items of the target channels with the result channel.

25 Claims, 6 Drawing Sheets

(51) Int. Cl.
  *H04N 21/2743* (2011.01)
  *H04N 21/4788* (2011.01)
  *H04N 21/25* (2011.01)
  *H04N 21/258* (2011.01)
  *H04N 21/472* (2011.01)
  *H04N 21/647* (2011.01)
  *H04N 21/462* (2011.01)
  *H04N 21/488* (2011.01)
  *H04N 21/482* (2011.01)

(52) U.S. Cl.
  CPC ......... *H04N 21/472* (2013.01); *H04N 21/482* (2013.01); *H04N 21/4882* (2013.01); *H04N 21/64784* (2013.01)

(56) References Cited

U.S. PATENT DOCUMENTS

| | | |
|---|---|---|
| 2003/0126600 A1 | 7/2003 | Heuvelman |
| 2005/0132420 A1 | 6/2005 | Howard et al. |
| 2011/0004831 A1 | 1/2011 | Steinberg |
| 2011/0145064 A1* | 6/2011 | Anderson ............ G06Q 30/02 705/14.53 |
| 2011/0321072 A1* | 12/2011 | Patterson ......... H04N 21/44222 725/5 |
| 2012/0054278 A1* | 3/2012 | Taleb .................... G06Q 50/01 709/204 |
| 2012/0059795 A1 | 3/2012 | Hersh et al. |
| 2012/0143700 A1 | 6/2012 | Bhattacharya et al. |
| 2012/0185892 A1 | 7/2012 | Camplejohn et al. |
| 2012/0227064 A1 | 9/2012 | Neil |
| 2012/0277004 A1 | 11/2012 | Moinuddin et al. |
| 2012/0284290 A1 | 11/2012 | Keebler |
| 2012/0311649 A1 | 12/2012 | Patten et al. |
| 2014/0020027 A1* | 1/2014 | Korst ................... H04N 21/458 725/47 |
| 2014/0095611 A1* | 4/2014 | Weinstein ............... H04L 67/22 709/204 |
| 2014/0229293 A1 | 8/2014 | Huang |
| 2015/0007235 A1 | 1/2015 | Lewis |

OTHER PUBLICATIONS

USPTO, Office Action for U.S. Appl. No. 14/588,135, dated Nov. 2, 2015.
USPTO, Final Office Action for U.S. Appl. No. 14/588,135, dated Feb. 29, 2016.
International Search Report and the Written Opinion of the International Searching Authority for International Patent Application No. PCT/US15/17574, dated Jun. 9, 2015, 8 pages.
USPTO, Office Action for U.S. Appl. No. 14/588,135, dated Aug. 30, 2016.
USPTO, Final Office Action for U.S. Appl. No. 14/588,135, dated Jan. 18, 2017.
USPTO, Office Action for U.S. Appl. No. 14/588,135, dated Jun. 6, 2017.
EP Search Report for EP Application No. 15755574.9, dated Jun. 12, 2017 (11 pages).
EP Search Report for EP Application No. 15755332.2, dated Jun. 8, 2017 (11 pages).

\* cited by examiner

MERGING CONTENT CHANNELS

PRIORITY CLAIM TO RELATED APPLICATION

This application claims the benefit under 35 U.S.C. § 119(e) of U.S. Patent Provisional Application No. 61/944,493, filed on Feb. 25, 2014, and Provisional Application No. 61/944,495, filed Feb. 25, 2014, the entirety of which is incorporation herein by reference.

CROSS-REFERENCE TO RELATED APPLICATIONS

The present application is related to co-filed U.S. patent application Ser. No. 14/588,135 entitled "Splitting Content Channels", which is assigned to the assignee of the present application.

TECHNICAL FIELD

This disclosure relates to the field of content sharing platforms and, in particular, to merging content channels.

BACKGROUND

On the Internet, social networks allow users to connect to and share information with each other. Many social networks include a content sharing aspect that allows users to upload, view, and share content, such as video content, image content, audio content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, and/or listen to digital music).

The content sharing platforms can include one or more channels or one or more channels can be viewable over the Internet. A channel is a mechanism for providing certain media items and/or for providing access to media items to subscribers. Media items for the channel can be selected by a user, uploaded by a user, selected by a content provider, or selected by a broadcaster. Users can subscribe to one or more channels. When the content of a channel is optimized (e.g., focused or specialized) for a coherent audience of users, users of the content sharing platform are more likely to keep watching content items of the channel and/or to subscribe to the channel.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for merging content channels is disclosed. The method includes identifying, by a processing device, target channels to merge into a result channel, wherein the result channel is formed in view of at least one set of users of the target channels viewing at least one of a same set or a similar set of content items from the target channels. The method further includes subscribing, by the processing device, the users of the target channels to the result channel and associating, by the processing device, the set of the content items of the target channels with the result channel.

In one implementation, the identifying further includes mapping the users of the target channels to the content items of the target channels that the users have viewed, grouping the users into sets of users in view of a probability that the users viewed the at least one of the same or the similar set of the content items, determining whether each of the grouped sets of users satisfies a threshold span of the users over the target channels, and determining whether a number of the sets of users satisfied a threshold number of groups for merging the target channels. Furthermore, for each set of the sets of users, at least one of a difference between a number of users that are subscribed to each target channel or a difference between a percentage of users that are subscribed to each target channel may be compared to the threshold span of the users.

In some implementations, the result channels and the target channel may be provided by a content sharing platform. Furthermore, the method also includes updating feeds of the users of the result channel to reflect the result channel. In addition, the updating further includes, for each user of the set of users, removing feed items corresponding to the target channel; and replacing the feed items corresponding to the target channel with feed items of the result channel.

In one implementation, the identifying further includes suggesting to an owner of the target channels that the target channels be merged into the result channel, and receiving confirmation from the owner to proceed with merging of the target channels into the result channel. In addition, the method may include automatically generating a user interface (UI) for the result channel utilizing UI elements of the target channels.

Furthermore, the identifying of the method may further include suggesting to one or more owners of the target channels that the target channels be cross-promoted, and receiving confirmation from the one or more owners to proceed with cross-promotion of the target channels. In one implementation, each of the target channels includes content items having at least one of a common topic, theme, or substance. In addition, each of the target channels may include content items having a common source.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for merging content channels. A content sharing platform may include multiple channels. A channel can be an assemblage of data content available from a common source, or data content having a common topic, theme, or substance. Content creators on the content sharing platform may have multiple channels that they publish content to, or they may have one channel which contains all of their published content. Optimizing the content of a channel so that it targets a coherent audience of users results in users that are more likely to keep watching content of the channel and that are more likely to subscribe to the channel. If a channel includes content that crosses multiple genres, it may be less appealing to a viewer because that viewer might like one genre of video on the channel and not another. As a result, the overall value of the channel is diluted for the user.

Implementations of the disclosure enable two or more existing channels (e.g., "target channels") of a content sharing platform to be merged into a single channel. The selection of the target channels for merger may be based on a distribution of users of the target channels over what content of the target channels that the users consume and how many of the users of each target channel overlap in terms of this distribution.

In some implementations, a UI component recommends to the channel owner that the target channel be merged into a single result channel. Once the channel owner approves and/or initiates a merger of the target channels, content items from the target channels are associated with the result channel and the set of users from the target channels are subscribed to the result channel. The result channel is then launched on the content sharing platform to include the identified content items and subscribed users. In some implementations, the feeds of the subscribed users are updated to reflect that content items from the target channels now originate from the result channel. A feed may be a list of content that is frequently updated to reflect recent activity of one or more users.

Previous implementations of content sharing platforms and social networks do not provide a solution for merging existing channels into a single result channel. As such, these previous implementations of content sharing platforms and/or social networks are not able to provide a solution to optimize channel content for a focused audience of users, and, as such, are limited in the ability to provide solutions for channel owners to increase viewership of channels and increase affinity between users and channels.

Figure 1:
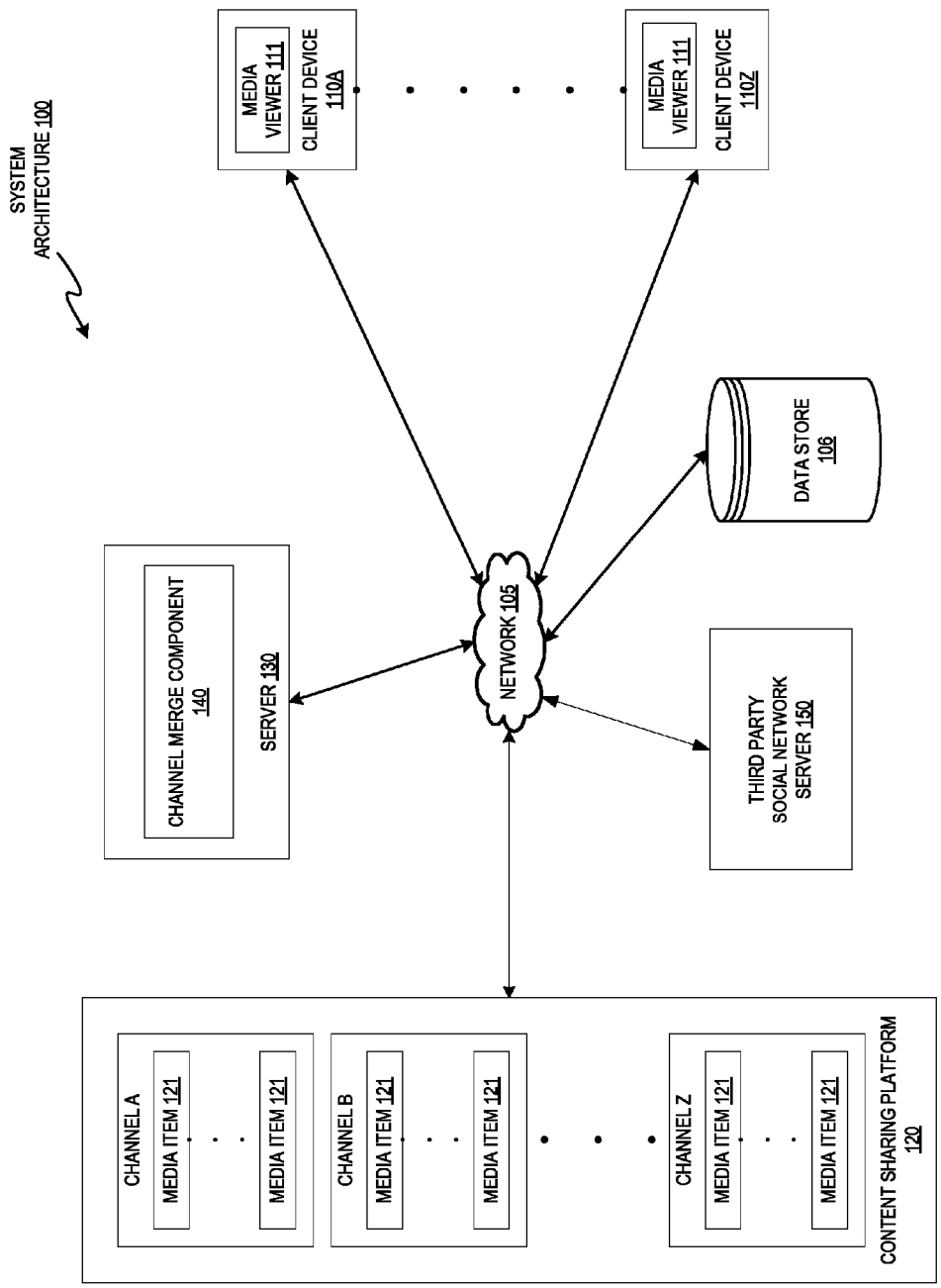
FIG. 1 illustrates an example system architecture, in accordance with one implementation of the disclosure.

FIG. 1 illustrates an example system architecture 100, in accordance with one implementation of the disclosure, for merging content channels of a content sharing platform. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a channel merge component 140. The channel merge component 140 enables two or more target channels of the content sharing platform 120 to be merged into a single result channel. The selection of the target channels for merger may be based on a distribution of users of the target channels over what content of the target channels that the users consume and how much users of each target channel overlap in terms of this distribution.

In some implementations, a UI component recommends to the channel owner that the target channel be merged into a single result channel. Once the channel owner approves and/or initiates a merger of the target channels, content items from the target channels are associated with the result channel and the set of users from the target channels are subscribed to the result channel. The result channel is then launched on the content sharing platform to include the identified content items and subscribed users. In some implementations, the feeds of the subscribed users are updated to reflect that content items from the target channels now originate from the result channel.

In some implementations, channel merge component 140 of server 130 may interact with content sharing platform 120 and/or with other third party social network servers 150 to provide implementations of the disclosure. Further description of the channel merge component 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
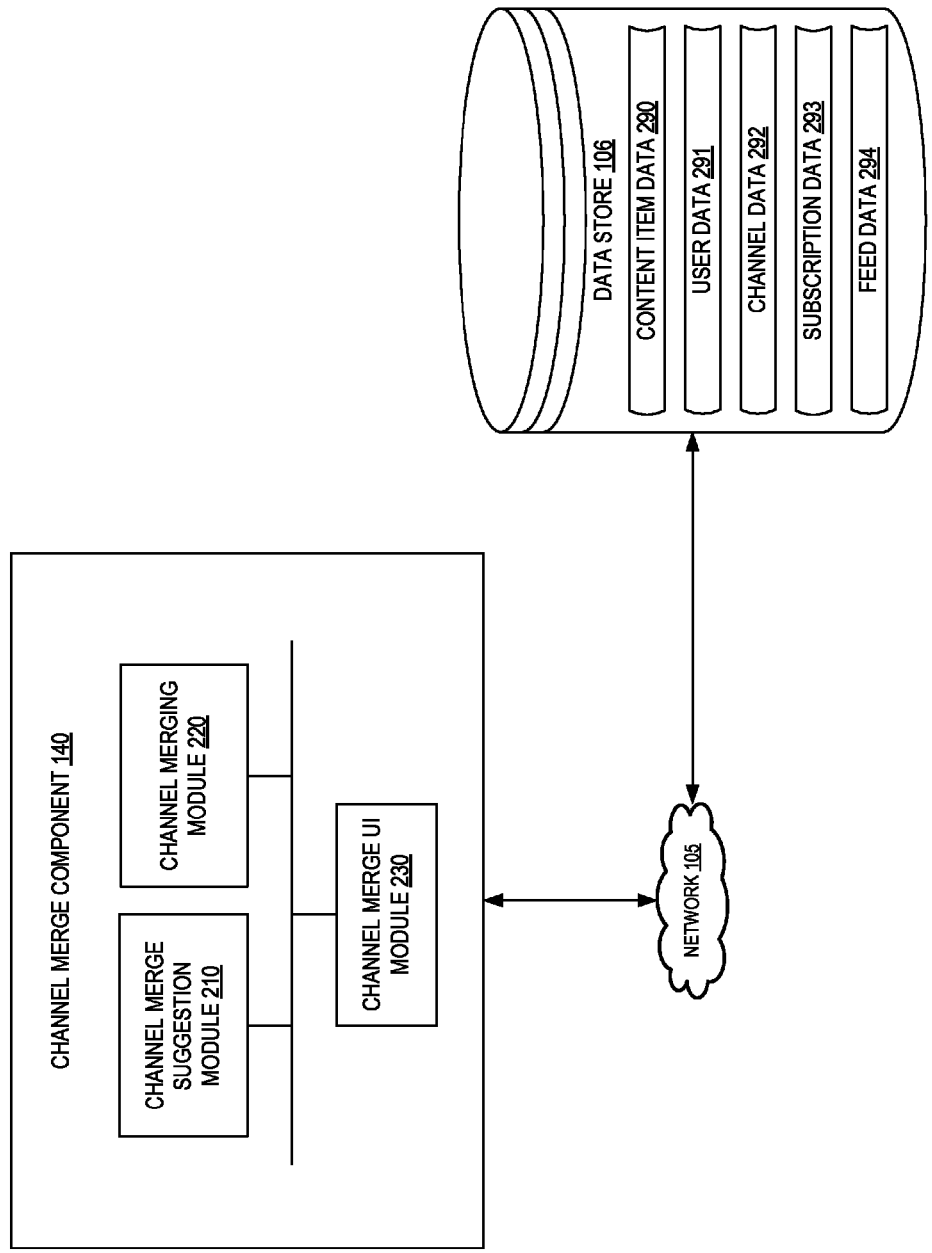
FIG. 2 is a block diagram illustrating a channel merge component in accordance with one implementation of the disclosure.

FIG. 2 is a block diagram illustrating a channel merge component 140 in accordance with one implementation of the disclosure. In one implementation, the channel merge component 140 includes a channel merge suggestion module 210, a channel merging module 220, and a channel merge UI generation module 230. More or less components may be included in the channel merge component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.).

The channel merge component 140 is communicatively coupled to the data store 106. For example, the channel merge component 140 may be coupled to the data store 106 via a network (e.g., via network 105 as illustrated in FIG. 1). In another example, the channel merge component 140 may be coupled directly to a server where the channel merge component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, channel data 292, subscription data 293, and feed data 294.

As discussed above, the channel merge component 140 enables two or more target channels of the content sharing platform 120 to be merged into a single result channel. In one implementation, the channel merge suggestion module 210 automatically determines when target channels may be merged together. There may be many reasons that may underlie merging a channel. In one implementation, merging a channel may positively enhance an affinity score between the channel and its users. An affinity score may refer to a numerical quantification of a user's relationship with another entity, such as a channel or another user, for example. The more interconnections (e.g., watches, likes, comments, tags, interactions, similar connections, etc.) between the user and the other entity (e.g., channel, other user, etc.), the higher the affinity score. In one implementation, a user's affinity score for a channel is generated by scoring the engagements (e.g., watches, likes, comments, tags, interactions, etc.) a user has with a channel, scores for the engagements are then divided by the time since the engagement occurred, and the divided scores are then summed together to produce the affinity score between a user and a channel. There may be other factors that are also included in the affinity score calculation, as well.

In one example scenario, two separate channels may have similar content items and overlapping viewership. In this case, it may be valuable to merge these channels together because the merged channel creates a stronger value proposition for the viewer in terms of affinity score because many content items are now grouped together on the same channel and it is easier to find content items that the users likes. An increased affinity score may, in turn, benefit a ranking of the channel in terms of appearance of channel content items in viewer feeds, on a what-to-watch page, on home pages of the users, and so on.

In one implementation, the channel merge suggestion module 210 identifies two or more target channels to merge into a result channel. In order to identify the two or more target channels, the channel merge suggestion module 210 may determine a set of users from the target channels. Then, the channel merge suggestion module 210 may map the users of the target channels to a set of content items of the target channels that the users have watched. The channel merge suggestion module 210 may access logs of the data store 106, such as content item data 290, user data 291, channel data 292, subscription data, and feed data 293 to make the target channel split determination. In some implementations, the channel merge suggestion module 210 may execute as a "continuous scanner", running its assessment over all new incoming data to the data store 106.

In one implementation, a clustering analysis may be used to cluster (e.g., group based on similarities) users together based on the users' likelihood of having watched the same or similar sets of content items from either of the target channels. Then, the cluster analysis may perform, for each resulting cluster, an intersection of the target channels and determine how much overlap (e.g., % of cluster that spans each target channel) exists between the target channels. Cluster analysis may refer to the task of grouping a set of objects in such a way that objects in the same group (called a cluster) are more similar (in some sense or another) to each other than to those in other groups (clusters). Various different algorithms may be used to achieve cluster analysis.

If, after applying the clustering analysis, there is low overlap of viewership between the two or more target channels, this suggests that the target channels are not good candidates for merging. However, if a target channels produce one large cluster of users that spans the target channels (i.e., large overlap of viewership), this suggest that the target channels are good candidates for merging. In some implementations, if the clustering analysis produces multiple clusters that span the target channels, this may suggest creating two or more new result channels, with a corresponding suggestion of which content items go into which new result channels.

In some implementations, the clusters sizes may be normalized by dividing the number of users from each target channel by the total number of subscribers to that target channel. This may be useful to address very popular channels that many users subscribe to. Without normalization, the clustering analysis may determine that this popular channel has the highest interaction with most other target channels (due to the sheer numbers alone).

In one implementation, a threshold assessment is applied to the resulting clusters of users to determine whether the clusters trigger a merging suggestion. For example, if a difference between a number of users belong to each target channel in a cluster is less than a predetermined threshold number of users, or if a difference between a percentage of users of the cluster belonging to each target channel is less than a predetermined threshold percentage of users, then the merging suggestion may be triggered for the target channels. Furthermore, threshold assessments may also apply to the number of clusters produced by the clustering analysis (e.g., one large cluster equally spanning target channels is a good candidate for margining, while multiple clusters that equally span the target channels may suggest creating additional channels instead of merging the channels). Other threshold assessments for determining when to trigger a merging suggestion are also contemplated by implementations of the disclosure, and are not limited to the example provided herein.

In some implementations, the two or more target channels suggested for merging should be owned by the same channel owner. In some implementations, if the target channels are not owned by the same channel owner (or, in some cases, even if the target channels are owned by the same channel owner), the channel merge suggestion module 210 may provide a suggestion to cross-promote the target channels instead of merging the target channels. A cross-promotion may refer to each of the target channels promoting content items of the other target channels to their corresponding users. The cross-promotion can be a powerful tool that drives users to subscribe to the promoted channels.

In one implementation, the channel merge UI module 230 may provide controls (e.g., UI interface elements) for the channel owner to merge the target channels. When the channel owner indicates, via the controls of the UI provided by the channel merge UI module 230, that target channels are to be merged, the channel merging module 220 handles the creation of the new result channel, and consolidation of users and content items to the new result channel.

In some implementations, the channel merge may be performed according to the suggestions provided by channel merge suggestion module 210. In other implementations, the channel merge may be performed according to explicit directives and parameters provided by the channel owner. For example, the channel owner may explicit identify the target channels and content items to associate with a result channel.

The channel merging module 220 may reuse one of the existing target channels as the result channel, or the channel merging module 220 may create an entirely new result channel. In the latter case, the channel merging module 220 may discard, archive, or maintain the target channels. The channel merging module 220 may also identify the content items from the target channels to be syndicated to the result channel. This might be chosen by the user or automated based on the distribution of users who watch each content item or based on existing curations of the content items, such as playlists. The combined content items may be sorted by the channel merging module 220 for the feed of the new result channel. In some implementations, the content items may be sorted chronologically, or may be ranked by popularity, and so on.

The channel merging module 220 may also identify the set of users and/or subscribers from the target channels to add to the result channels. The subscriptions of these identified users are modified to point to the new result channel. In some implementations, the total number of subscriptions may decrease when the target channels have overlapping subscribers. The channel merging module 220 may notify the users of the new result channel and corresponding subscription to the result channel. In some implementations, the user is automatically subscribed to the result channel. The user may be notified on the automatic subscription and provided an opportunity to decline the subscription, as well. In other implementations, authorization from the user is requested for the new subscription.

The channel merging module 220 may then update feeds of the subscribed users so that past events from the target channels now appear to have come from the new result channel. In some implementations, the channel merging module 220 may redirect keys that represent each of the target channels to point to the new result channel.

In addition, the channel merge UI module 230 may associate formatting and other UI elements with the result channel, including, but not limited to, providing a name, profile avatar, banners, and other formatting to the result channel. The channel owner may interact with channel merge UI module 230 in order to provide input for formatting the result channel.

Figure 3:
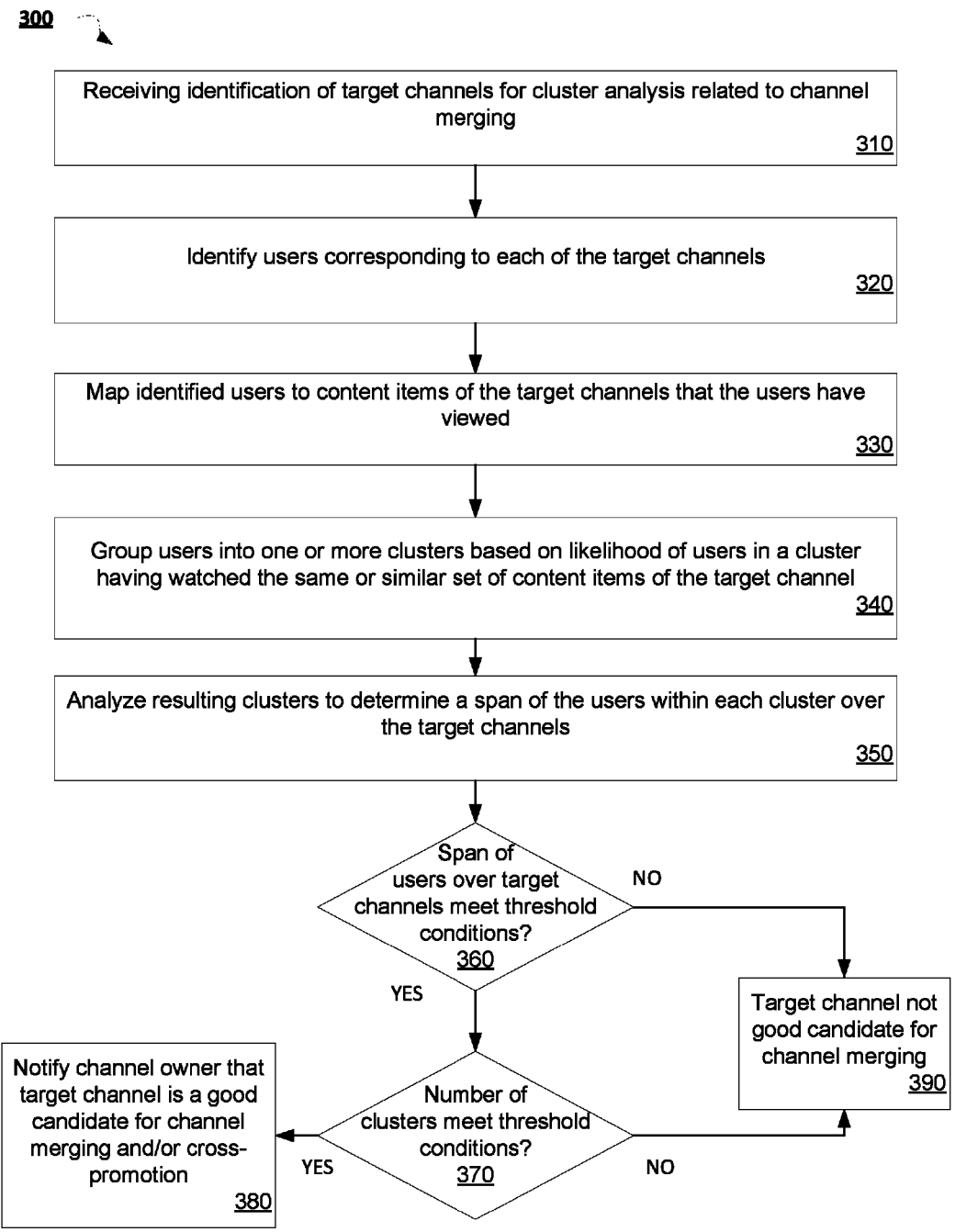
FIG. 3 is a flow diagram illustrating a method for suggesting a merge of target channels according to some implementations of the disclosure.

FIG. 3 is a flow diagram illustrating a method 300 for suggesting a merge of target channels according to some implementations of the disclosure. The method 300 may be performed by processing logic that comprises hardware (e.g., circuitry, dedicated logic, programmable logic, micro- code, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by channel merge component 140 as shown in FIGS. 1 and 2.

Referring to FIG. 3, method 300 begins at block 310 when identification is received of two or more target channels for cluster analysis related to channel merging. In one implementations, the cluster analysis is performed for the target channels on a continuous basis, utilizing a standing model of existing user and channel log data that is updated based on any new log data received for the user and channels of the content sharing platform. At block 320, users that correspond to the target channels are identified. The set of users may be the subscribed users to the target channels.

Then, at block 330, the identified users are mapped to content items of the target channels that the users have viewed. At block 340, the users are grouped into one or more clusters based on a likelihood of the users in a cluster having watched the same or similar set of content items of the target channels. This grouping utilizes the mapping performed at block 330.

Subsequently, at block 350, the resulting clusters are analyzed to determine, for each cluster, a span of the users over the target channels. Then, at decision block 360, it is determined whether the span of the users over the target channels meets threshold conditions. For example, the threshold conditions may include predetermined difference between the number of users subscribed to each target channel that the clusters should equal and/or fall below. The threshold conditions may also include a predetermined different between the percentage of users of a cluster subscribed to each target channel that the clusters should equal and/or fall below. If the threshold conditions at decision block 360 are not met, then method 300 proceeds to block 390, where it is determined that the target channels are not good candidates for channel merging.

On the other hand, if the threshold conditions are met at decision block 360, then method 300 may proceed to decision block 370 where it is determined whether the number of resulting clusters meets threshold conditions. For example, the threshold conditions for cluster numbers may include the number of clusters produced by the clustering analysis equaling or falling below a predetermined threshold number of clusters. The predetermined number of clusters for this threshold analysis may vary based on the number of subscribed users to the target channels and/or the number of content items associated with the target channels. If the cluster number threshold conditions are not met at decision block 370, then method 300 may proceed to block 390, which was described above.

On the other hand, if the cluster number threshold conditions are met at decision block 370, then method 300 may proceed to block 380. At block 380, the target channels are considered to be good candidates for channel merging, and the channel owner is notified with a suggestion to merge the target channels. In some implementations, the channel owner(s) of the target channels may also be notified that the target channels are good candidates for cross-promotion.

Figure 4:
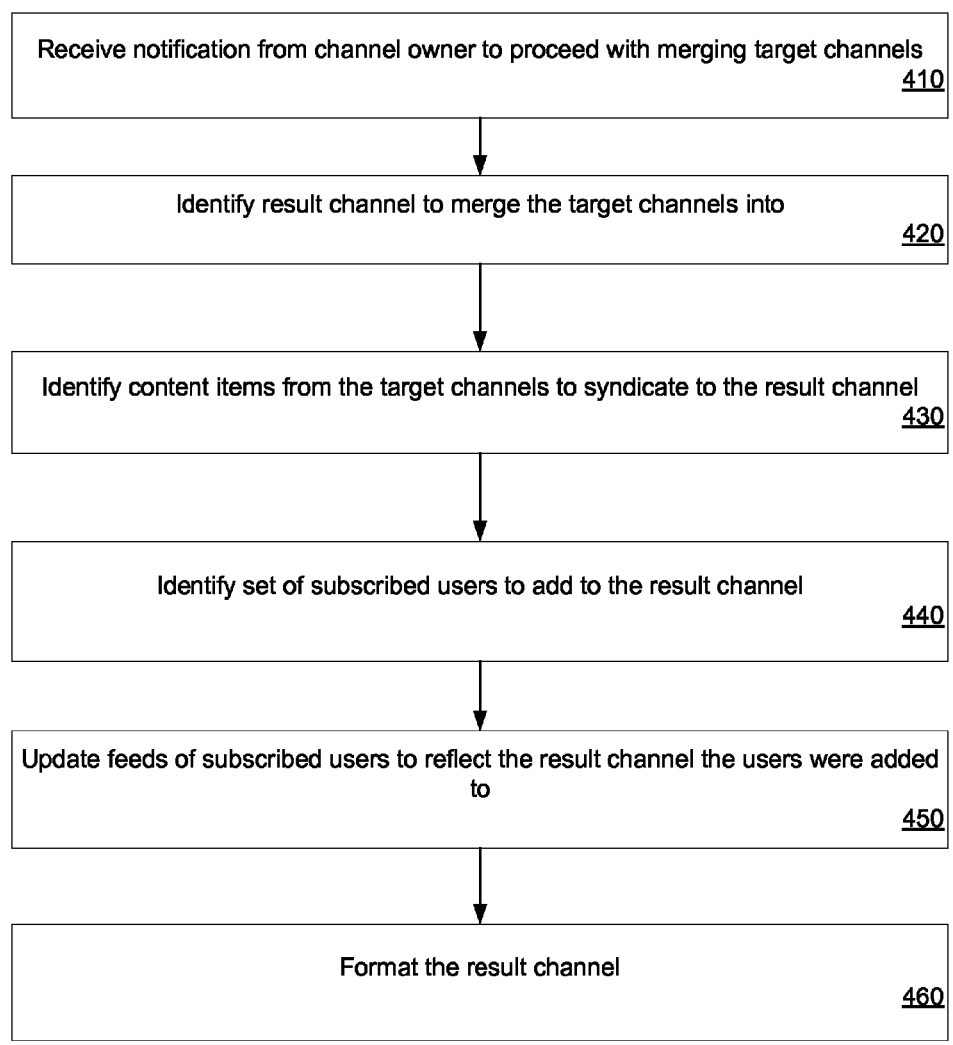
FIG. 4 is a flow diagram illustrating a method for merging target channels into a result channel, according to an implementation of the disclosure.

FIG. 4 is a flow diagram illustrating a method 400 for merging target channels into a result channel, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by channel merge component 140 as shown in FIGS. 1 and 2.

Referring to FIG. 4, method 400 begins at block 410 when a notification from a channel owner of two or more target channels is received. In one implementation, the notification includes instructions from the channel owner to proceed with merging the target channels per a channel merging suggestion provided by the content sharing platform, such as the channel merging suggestion provided by method 300 described with respect to FIG. 3. In other implementations, the channel owner may initiate the channel merging operation independent from a channel merging suggestion.

At block 420, a result channel is identified. The result channel may one of the target channels that is to be reused as the result channel, or the result channel an entirely new channel. At block 430, content items from the target channels are identified to syndicate to the result channel. In one implementation, the content items are used to cluster the users of the target channels via a clustering analysis based on likelihood of the users watching a same or similar set of content items from the target channels. The identified content items may be are correlated to and syndicated to the result channel.

Then, at block 440, a set of subscribed users is identified to add to the result channel. The users from each target channel are subscribed to the result channel. In some implementations, the users are also automatically subscribed to the result channel, with an option to decline the subscription.

Subsequently, at block 450, feeds of the subscribed users are updated to reflect the result channel that the users were added to. In one implementation, all old feed items from the target channels are removed from the user feeds and replaced with corresponding new feed items from the result channel that the users are now subscribed. In another implementation, the old target channel feed items on the users' feeds are updated to point to the result channel as the originator of the feed item.

Lastly, at block 460, result channel is formatted for viewing purposes. For example, UI elements are configured for the result channel, where the UI elements may include, but are not limited to, providing a name, profile avatar, banners, and other formatting to the result channel. The channel owner may interact with the content sharing platform to provide input for formatting the result channel.

Figure 5:
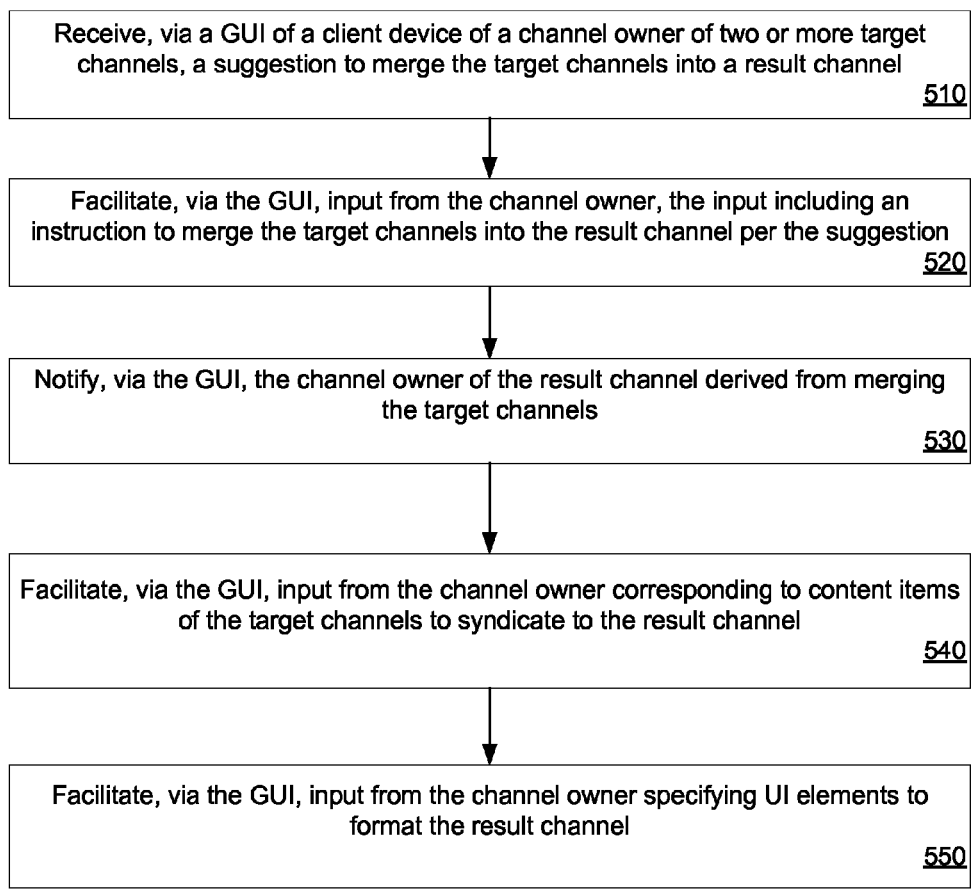
FIG. 5 is a flow diagram illustrating a method for interacting with a channel owner of target channels at a client device with respect to merging the target channels together into a result channel, according to an implementation of the disclosure.

FIG. 5 is a flow diagram illustrating a method 500 for interacting with a channel owner of a target channel at a client device with respect to splitting the target channel, according to an implementation of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by client device 110A-110Z, as shown in FIGS. 1 and 2.

Referring to FIG. 5, method 500 begins at block 510 when a suggestion to merge two or more target channels into a result channel is received via a GUI of a client device of a channel owner of the target channels. In one implementation, the client device is a mobile device. The target channels may each include a plurality of content items of a content sharing platform. In some implementation, a channel owner may also be referred to as an owning user. At block 520, input from the channel owner of the target channel is facilitated via the GUI. In one implementation, the input includes an instruction to merge the target channels into the result channel per the suggestion.

Subsequently, at block 530, the channel owner is notified, via the GUI, of the result channel derived from merging the target channels. In one implementation, the result channel includes a combined set of the content items of the target channels. At block 540, input from the channel owner is facilitated, via the GUI, where the input corresponds to one or more of the plurality of content items of the target channels to syndicate to the result channel. Lastly, at block 550, additional input from the channel owner is facilitated, via the GUI, where the additional input specifies UI elements to format the result channel.

Figure 6:
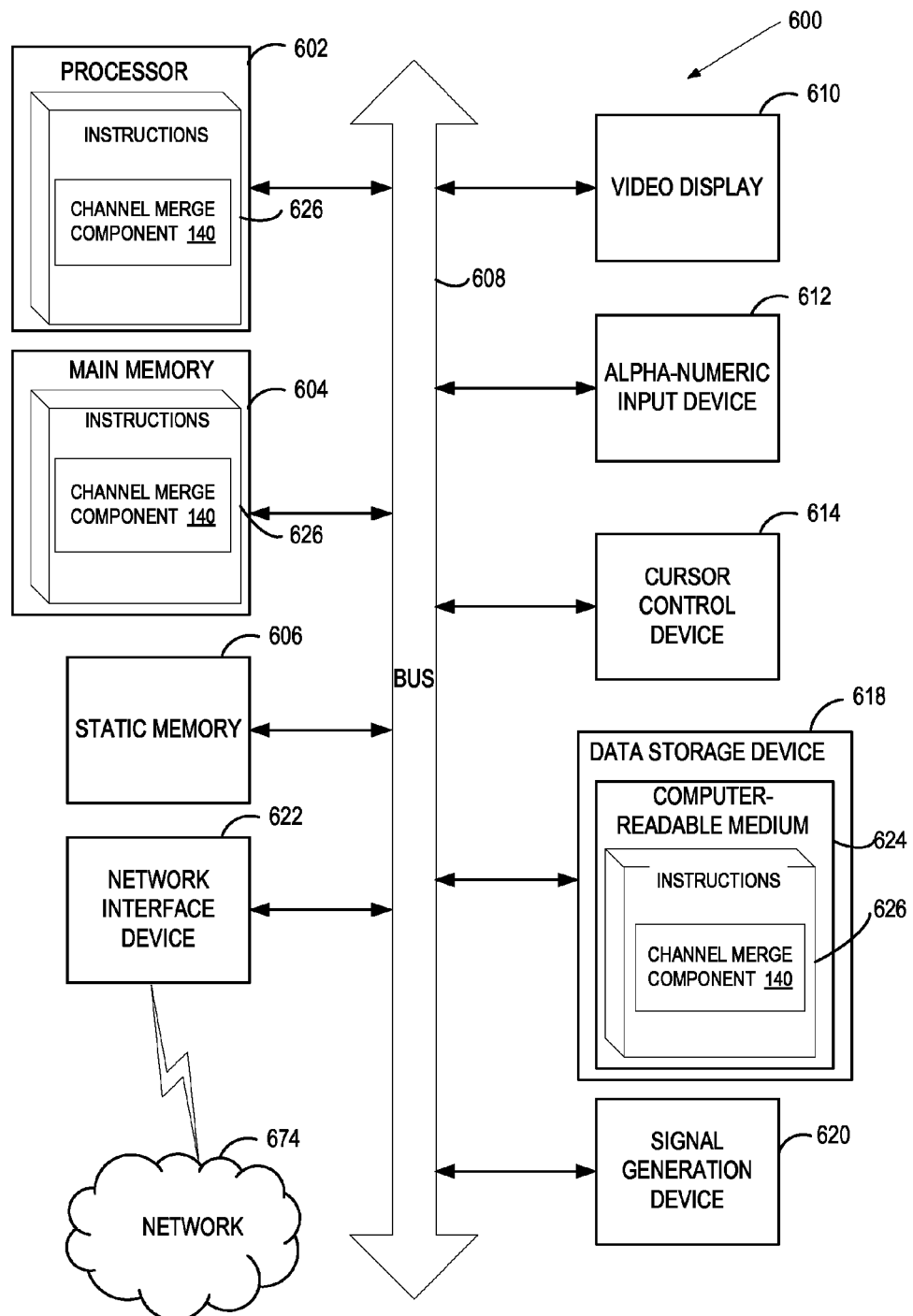
FIG. 6 is a block diagram illustrating an exemplary computer system, according to some implementations.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets.

The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one implementation, the instructions 626 include instructions for a channel merge component 140, which may correspond, respectively, to their identically-named counterparts described with respect to FIGS. 1 and 2, and/or a software library containing methods for merging channels of content sharing platform. While the computer-readable storage medium 624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
identifying, by a processing device, two or more target channels to merge into a result channel;
grouping users of the target channels into sets of users based on an indication that the users viewed a similar set of the content items from the target channels;
in response to determining that a number of the sets satisfies a number of sets threshold condition and in response to determining that a number of the users in each of the sets that are subscribed to the target channels satisfies an overlap threshold condition, generating the result channel;
subscribing, by the processing device, the users of the target channels to the result channel;
associating, by the processing device, the set of the content items of the target channels with the result channel;
generating, without channel owner interaction, a user interface (UI) for the result channel utilizing formatting and UI elements of the target channels; and
updating activity information provided to a user of the target channels to reflect the result channel, wherein the activity information provided to the user of the target channels comprises a subset of content items from the result channel and other channels to which the user of the target channels is subscribed, and wherein updating the activity information further comprises updating, in the activity information of each of the users of the target channels, the items corresponding to the target channels to point to the result channel as an originator of the items, wherein the activity information is separate from the result channel.

2. The method of claim 1, wherein the result channel and the target channels are provided by a content sharing platform.

3. The method of claim 1, wherein grouping the users of the target channels further comprises:
mapping the users of the target channels to the content items of the target channels that the users have viewed; and
determining whether each of the grouped sets of users satisfies a threshold span of the users over the target channels.

4. The method of claim 3, wherein, for each set of the sets of users, at least one of a difference between a number of users that are subscribed to each target channel or a difference between a percentage of users that are subscribed to each target channel is compared to the threshold span of the users.

5. The method of claim 1, wherein updating the information comprises updating feeds of the users of the result channel to reflect the result channel.

6. The method of claim 5, wherein the updating further comprises, for each user of the set of users:
removing feed items corresponding to the target channel; and
replacing the feed items corresponding to the target channel with feed items of the result channel.

7. The method of claim 1, wherein the identifying further comprises:
suggesting to an owner of the target channels that the target channels be merged into the result channel; and
receiving confirmation from the owner to proceed with merging of the target channels into the result channel.

8. The method of claim 1, wherein the UI for the result channel is automatically generated, and wherein the UI elements comprise at least one of a name, profile avatar, or banners.

9. The method of claim 1, wherein the identifying further comprising:
suggesting to one or more owners of the target channels that the target channels be cross-promoted; and
receiving confirmation from the one or more owners to proceed with cross-promotion of the target channels.

10. The method of claim 1, wherein each of the target channels comprise content items having at least one of a common topic, theme, or substance.

11. The method of claim 1, wherein each of the target channels comprise content items having a common source.

12. An apparatus comprising:
a display device;
a memory communicably coupled to the display device; and
a processing device communicably coupled to the memory, the processing device to execute instructions to:
identify two or more target channels to merge into a result channel;
group users of the target channels into sets of users based on an indication that the users viewed a similar set of the content items from the target channels;
in response to determining that a number of the sets satisfies a number of sets threshold condition and in response to determining that a number of the users in each of the sets that are subscribed to the target channels satisfies an overlap threshold condition, generate the result channel
subscribe the users of the target channels to the result channel;
associate the set of the content items of the target channels with the result channel;
generate, without channel owner interaction, a user interface (UI) for the result channel utilizing formatting and UI elements of the target channels; and
update activity information provided to a user of the target channels to reflect the result channel, wherein the activity information provided to the user of the target channels comprises a subset of content items from the result channel and other channels to which the user of the target channels is subscribed, and wherein updating the activity information further comprises updating, in the activity information of each of the users of the target channels, the items corresponding to the target channels to point to the result channel as an originator of the items, wherein the activity information is separate from the result channel.

13. The apparatus of claim 12, wherein the processing device to group the users of the target channels further comprises the processing device to:
map the users of the target channels to the content items of the target channels that the users have viewed; and
determine whether each of the grouped sets of users satisfies a threshold span of the users over the target channels.

14. The apparatus of claim 12, wherein the processing device to update the information further comprises the processing device to update feeds of the users of the result channel to reflect the result channel.

15. The apparatus of claim 12, wherein the processing device to identify the target channels further comprises the processing device to:
   suggest to an owner of the target channels that the target channels be merged into the result channel; and
   receive confirmation from the owner to proceed with merging of the target channels into the result channel.

16. The apparatus of claim 12, wherein the processing device further to automatically generate the UI for the result channel, and wherein the UI element comprises at least one of a name, profile avatar, or banners.

17. The apparatus of claim 12, wherein the result channels and the target channel are provided by a content sharing platform, and wherein each of the target channels comprise content items of the content sharing platform having at least one of a common topic, theme, substance, or source.

18. A non-transitory machine-readable storage medium storing instructions which, when executed, cause a processing device to perform operations comprising:
   identifying, by the processing device, two or more target channels to merge into a result channel;
   grouping users of the target channels into sets of users based on an indication that the users viewed a similar set of the content items from the target channels;
   in response to determining that a number of the sets satisfies a number of sets threshold condition and in response to determining that a number of the users in each of the sets that are subscribed to the target channels satisfies an overlap threshold condition, generating the result channel;
   subscribing, by the processing device, the users of the target channels to the result channel;
   associating, by the processing device, the set of the content items of the target channels with the result channel;
   generating, without channel owner interaction, a user interface (UI) for the result channel utilizing formatting and UI elements of the target channels; and
   updating activity information provided to a user of the target channels to reflect the result channel, wherein the activity information provided to the user of the target channels comprises a subset of content items from the result channel and other channels to which the user of the target channels is subscribed, and wherein updating the activity information further comprises updating, in the activity information of each of the users of the target channels, the items corresponding to the target channels to point to the result channel as an originator of the items, wherein the activity information is separate from the result channel.

19. The non-transitory machine-readable storage medium of claim 18, wherein the grouping the users of the target channels further comprises:
   mapping the users of the target channels to the content items of the target channels that the users have viewed; and
   determining whether each of the grouped sets of users satisfies a threshold span of the users over the target channels.

20. The non-transitory machine-readable storage medium of claim 18, wherein the identifying further comprising:
   suggesting to an owner of the target channels that the target channels be merged into the result channel; and
   receiving confirmation from the owner to proceed with merging of the target channels into the result channel.

21. The non-transitory machine-readable storage medium of claim 18, wherein the UI for the result channel is automatically generated, and wherein the UI elements comprise at least one of a name, profile avatar, or banners.

22. The non-transitory machine-readable storage medium of claim 18, wherein the result channels and the target channel are provided by a content sharing platform, and wherein the target channel comprises content items of the content sharing platform having at least one of a common topic, theme, substance, or source.

23. A method comprising:
   receiving, via a graphical user interface (GUI) of a mobile device, a suggestion to merge two or more target channels into a result channel, each of the target channels comprising one or more content items, wherein users of the target channel are grouped into sets of users based on an indication that the users viewed a similar set of the content items from the target channels, and wherein the suggestion to merge is based on a number of the sets satisfying a number of sets threshold condition and is based on a number of the users in each of the sets that are subscribed to the target channels satisfying an overlap threshold condition;
   facilitating, via the GUI, input from an owning user of the target channels, the input comprising an instruction to merge the target channels into a result channel per the suggestion; and
   notifying, via the GUI, the owning user of the results channel that is a product of the merge of the target channels;
   wherein user interfaces (UIs) for the result channel is generated, without owning user interaction, based on formatting and UI elements of the target channels;
   wherein activity information provided to a user of the target channels is updated to reflect the result channel, the activity information provided to the user of the target channels comprising a subset of content items from the result channel and other channels to which the user of the target channels is subscribed, and wherein the activity information is updated by updating, in the activity information of each of the users of the target channels, the items corresponding to the target channels to point to the result channel as an originator of the items, wherein the activity information is separate from the result channel.

24. The method of claim 23, further comprising facilitating, via the GUI, input from the owning user corresponding to the one or more content items of the target channels to syndicate to the result channel.

25. The method of claim 23, further comprising facilitating, via the GUI, input from the owning user, the input specifying the UI elements to format the result channel, wherein the UI elements comprise at least one of a name, profile avatar, or banners.

* * * * *